March 13, 1945. J. S. NEWTON ET AL 2,371,255
REDUCTION GEARING FOR TURBINE-DRIVEN LOCOMOTIVES
Filed Feb. 3, 1943 2 Sheets-Sheet 2
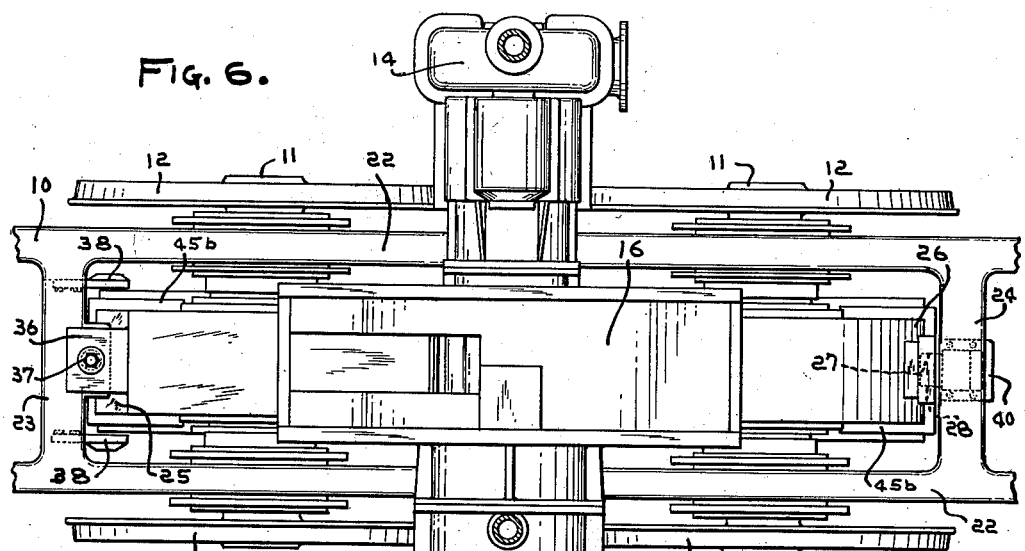
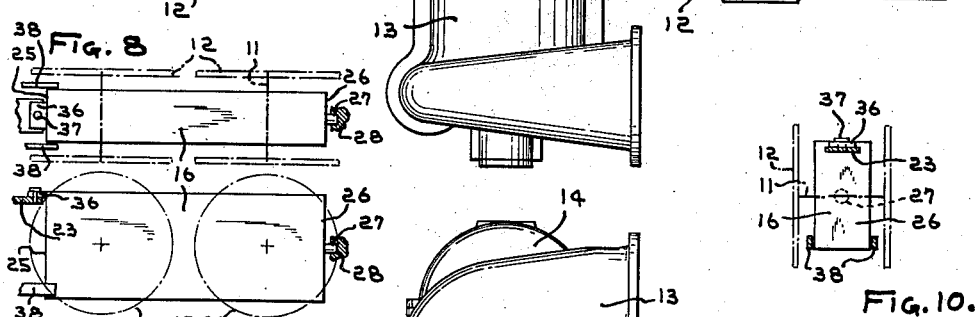
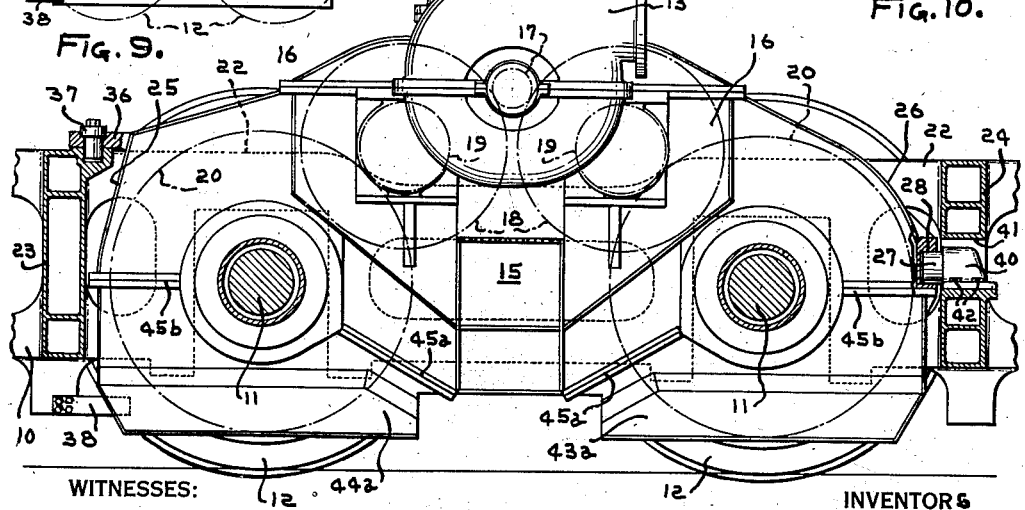
INVENTORS
JOHN S. NEWTON
AND EDWIN E. ARNOLD
BY
ATTORNEY Patented Mar. 13, 1945

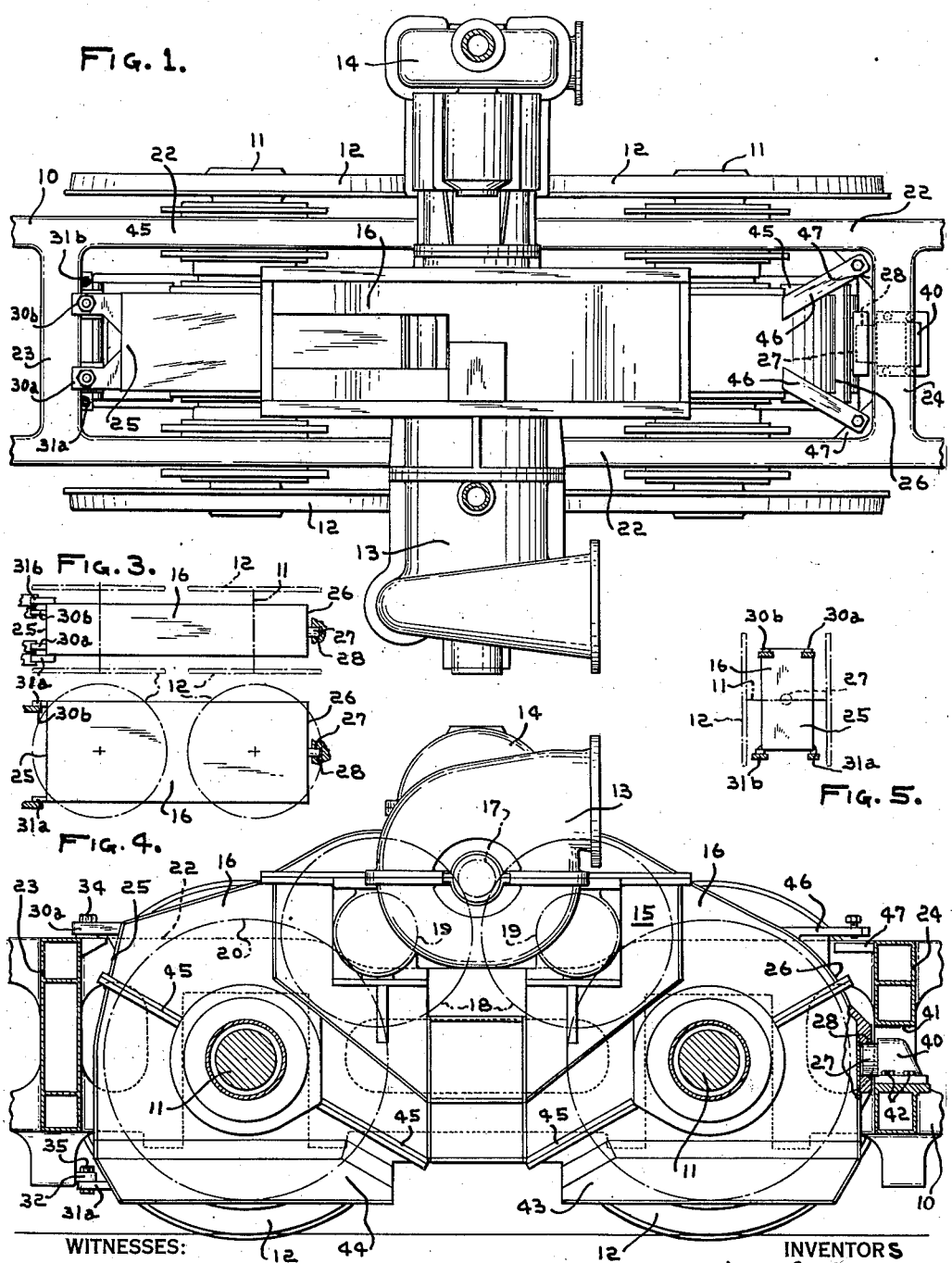

2,371,255

UNITED STATES PATENT OFFICE 2,371,255

REDUCTION GEARING FOR TURBINE-DRIVEN LOCOMOTIVES

John S. Newton, Drexel Hill, and Edwin E. Arnold, Pittsburgh, Pa., assignors to Westinghouse Electric & Manufacturing Company, East Pittsburgh, Pa., a corporation of Pennsylvania Application February 3, 1943, Serial No. 474,530

8 Claims. (Cl. 105—38)

The invention relates to locomotives and the like wherein power is transmitted from a prime mover to the driving axle or axles by means of reduction gearing, and it has for an object to provide a casing for the gearing which may be readily connected and disconnected with respect to the frame and which provides for assembly and removal of wheels and axles at the bottom without detachment from the frame.

A more particular object of the invention is to provide connections between the frame and the casing to minimize stressing of the latter on account of frame deflection or driving axle lateral forces.

These and other objects are effected by the invention as will be apparent from the following description and claims taken in accordance with the accompanying drawings, forming a part of this application, in which:

Fig. 1 is a fragmentary plan view of a locomotive showing the improved mounting means for the gear casing;

Fig. 2 is a side elevational view of apparatus shown in Fig. 1;

Figs. 3, 4, and 5 are diagrammatic views of the supporting arrangement;

Figs. 6 and 7 are views similar to Figs. 1 and 2 but showing a modified mounting for the gear casing; and, Figs. 8, 9, and 10 are diagrammatic views of the modified supporting arrangement.

In the drawings, there is shown a locomotive frame 10 supported by driving axles 11 attached to driving wheels 12. Forward and backing turbines 13 and 14 are connected by reduction gearing, at 15, to the driving axles 11. The reduction gearing is enclosed in and supported by a casing 16 and the latter also carries the forward and backing turbines.

The reduction gearing, at 15, preferably includes a high-speed pinion 17 meshing with high-speed gears 18 unitary with low-speed pinions 19 meshing with low-speed gears 20 flexibly connected in any suitable manner to the driving axles 11.

The gear casing 16 is connected to the locomotive frame 10 so as to avoid stressing thereof due to deflection of the frame or to driving axle forces. To this end, the frame includes side members 22 connected by cross members 23 and 24 defining a rectangular space within which is located the gear casing, the gear casing having one end 25 located adjacent to the cross beam 23 and the other end 26 located adjacent to the cross beam 24.

The end 25 of the casing is supported by and attached to the frame, including the cross beam 23, in such a manner as to prevent movement of the casing 16 lengthwise of the frame. The other end 26 of the gear casing is supported by means, for example, the trunnion 27 attached to the cross beam 24 and fitting in the socket or bearing 28 carried by the gear casing end. The trunnion 27 and the socket 28 are arranged substantially midway of the width of the frame, and the supporting connection provided thereby not only facilitates manufacture and assembly but it prevents the casing being stressed due to endwise forces which might otherwise be applied to the gear casing if the latter were rigidly fastened to the frame at each end.

The trunnion 27 is located at or near to the horizontal plane of the driving axles 11 with the result that the gear casing is not stressed because of lateral forces. The driving wheels and axles must be capable of up and down and angular movements with respect to the frame, and, therefore, with respect to the gear casing carried thereby. Accordingly, the axle gears, as is customary, must be connected to the axles by couplings sufficiently flexible to permit of such movements. In operation, the couplings may result in stressing of the gear casing if lateral forces due thereto are applied to the casing in an eccentric manner, that is, are applied so that a moment exists between the horizontal planes of the axles and of the trunnion axes; however, by having the trunnion axis located at or near to the driving axle horizontal plane, this moment is reduced to zero, or to a very small value, with the result that the gear casing is not stressed on account of such forces.

With respect to connecting the end 25 of the gear casing so as to prevent movement lengthwise of the frame and in relation to the cross beam 23, in Figs. 1 to 5, inclusive, four points of connection are provided and which serve this purpose. The casing has upper feet 30a and 30b bearing on the cross beam 23 and lower feet 31a and 31b connected to ledges 32 formed on the frame. The feet 30a and 30b are connected to the cross beam 23 and the feet 31a and 31b are connected to the supporting ledges 32 by bolts 34 and 35, respectively.

Therefore, the end 25 of the gear casing is restrained against relative longitudinal movement as well as angular movement with respect to the frame at the vertical transverse plane of the latter passing through the bolts 34 and 35. Hence, weaving or deflection of the frame may occur without stresses due thereto being imposed on the gear casing, the end 25 of the latter being rigidly connected to the frame at the region of the cross beam 23 and deflection of the frame being accommodated by the trunnion 27 and the socket 28.

With the arrangement shown in Figs. 1 to 5, inclusive, there is provided the equivalent of a three-point suspension in vertical and horizontal planes, as will be clear from a consideration of Figs. 3 and 4. In Fig. 3, from the point of view of a horizontal plane, it will be seen that the end 25 is, in effect, supported at two spaced points whereas the end 26 is supported at a single point. Likewise, from Fig. 4, it will be seen that the points 30a, 30b, and 31a and 31b constitute, in effect, two spaced vertical points or regions, which, with the trunnion 27, constitute a three-point suspension in a vertical longitudinal plane. With the frame supported by the frame in a three-point manner both in vertical and horizontal planes, it will be apparent that deflection of the frame may occur without the gear casing being stressed, the trunnion 21 and the socket 28 providing for movement of the frame in relation to the gear casing to achieve this result.

In Figs. 6 to 10, inclusive, instead of supporting the end 25 of the gear casing 16 from the frame so as to be connected to the latter at two upper and two lower points, there is shown a somewhat less rigid arrangement wherein the casing has a single supporting foot 36 bearing on the top of the cross beam 23 and connected thereto by the pin 37; and, to restrict angular movement of the casing relative to the frame and cross beam 23 in the vertical transverse plane of the pin 37, the frame has bottom plates 38 bearing against opposed sides of the lower portion of the casing. This arrangement provides for the achievement of the results of the structure already described while, at the same time, permitting of a greater extent of accommodating relative movement, it being apparent that the frame may be deflected laterally with a slight amount of angular movement of the cross beam 23 with respect to the end 26 and about a vertical axis without the gear casing being stressed.

Not only should the gear casing 16 be capable of being readily located with respect to the frame but means should be provided facilitating the attachment and detachment thereof with respect thereto. To this end, the trunnion 27 is carried by a block 40 arranged in an opening 41 formed in the cross beam 24 and attached to the latter by bolts 42. With the tabs or feet 30a and 30b properly located with respect to the beam 23, the other end of the casing may be positioned with respect to the opening 41 so as to align the socket 28 with the trunnion 27, whereupon the trunnion block may be slid in the opening toward the gear casing to engage the trunnion in the socket, after which the block is fastened to the cross beam by means of the bolts 42.

The gear casing 16 should also be constructed so as to permit the removal of the wheels and axles at the bottom. Therefore, in Fig. 2, the casing 16 has lower cover portions 43 and 44 connected to the main body portion thereof by means of inclined flange joints 45 which intersect the axes of the driving axles, the joints extending outwardly and upwardly toward the gear casing ends. As the trunnion socket 28 is carried by the right-hand cover portion 43 in Fig. 2, means should be provided to maintain the position of the casing 16 with respect to the frame incident to removal and replacement of the cover portion.

Hence, the casing is provided with lugs or feet 46 arranged to overlap supports 47 formed on the frame having clearance therebetween to accommodate any suitable spacing means or shims when the cover portion 43 is to be removed. If it is desired to remove the cover portion 43, the lugs 46 are spaced or wedged up sufficiently to unload the engaging surfaces of the trunnion and socket whereupon the trunnion block may be unbolted and readily slid backwardly to disengage the trunnion from the socket, after which the cover portion may be removed. The shim or spacing means holds the gear casing in position with assurance that dismantled parts may be reassembled with ready engagement of the socket and trunnion. With respect to the cover portion 44, it will be noted that the lug or tab 31a is arranged below the lug 32 so that such a cover portion may be removed downwardly without interference.

In Fig. 7, the casing 16 is formed with cover portions 43a and 44a which have modified joints with respect to the main body portion of the casing, the joints including inclined portions 45a which extend upwardly and outwardly from the bottom of the casing toward the axes of the driving axles and horizontal portions 45b which extend from the axles outwardly to the ends of the casing. With this modified type of joint, it will be obvious that the body portion of the casing will be supported by the trunnion when the cover portion 43a is removed. As shown, the trunnion has its axis spaced a slight distance above the horizontal plane containing the axes of the driving axles; however, it will be apparent that, as the load of the gear casing is borne by the top part of the socket engaging the trunnion, considerable latitude exists for varying the location of the socket and trunnion with respect to the plane of the axes of the driving axles.

While the invention has been shown in several forms, it will be obvious to those skilled in the art that it is not so limited, but is susceptible of various other changes and modifications without departing from the spirit thereof, and it is desired, therefore, that only such limitations shall be placed thereupon as are specifically set forth in the appended claims.

What is claimed is:

1. In a locomotive, a longitudinally-extending frame construction; means including a pair of driving axles extending transversely of the frame construction for supporting the latter, means including a turbine and reduction gearing for transmitting power from the latter to the driving axles; a casing enclosing the reduction gearing and supporting the latter and the turbine; said casing extending below and encompassing the driving axles; means providing for attachment of one end of the casing construction to the frame construction and including upper and lower connections cooperating to restrict relative lengthwise and transverse movements of said end of the casing construction and the frame construction and relative angular movement thereof in the plane of the connections; means for attaching the other end of the casing construction to the frame construction; the last-named means comprising a trunnion member having a trunnion portion, a socket member having a cylindrical socket portion for telescopic engagement with the trunnion portion, and means for connecting the trunnion and socket members to the constructions so that the axis of the trunnion and socket portions extends longitudinally of the frame construction and is located horizontally between said upper and lower connections for said one end of the casing construction; said last-named means being constructed and arranged to provide for attachment and detachment of one of said members so that the detached member may be moved axially to effect telescopic engagement of the trunnion and socket portions incident to connecting said other end of the casing construction and the frame construction and to disengage such portions incident to disconnecting said end of the casing construction and the frame construction; said casing construction including body and cover portions and joints connecting such portions with the joints extending upwardly and outwardly from the bottom of the casing construction so as to intersect the driving axles to provide for removal of the cover portions incident to removal of the driving axles at the bottom without disturbing the positional relation of the body portion of the casing construction with respect to the frame construction and said lower connections being between the frame construction and the cover portion at said one end of the casing construction and being arranged to provide freedom for downward removal of such cover portion.

2. The combination as claimed in claim 1, wherein the frame construction has an opening providing for relative axial movements of the trunnion and socket members incident to engagement and disengagement thereof and wherein bolts fasten the frame construction and one of the members together with the trunnion and socket portions telescopically engaged.

3. In a locomotive, a frame having side members connected by first and second cross members defining a rectangular space; means for supporting said frame including a pair of driving axles extending crosswise of said space and disposed near the cross members; means including a turbine and reduction gearing for applying power to the driving axle; a casing enclosing the reduction gearing and supporting the latter and the turbine; said casing being disposed in said space with its first end located adjacent to said first cross member and its second end located adjacent to said second cross member; upper and lower connections for attaching the first end of the casing to the frame and operative to restrict movement of such first end of the casing lengthwise and transversely of the frame and angularly in a vertical plane transverse to the first cross member; said connections including foot means connected to the casing and bearing horizontally on said first cross member and vertically-disposed pin means connecting the foot means to the first cross member; means for attaching the second end of the casing to the second cross member; the last-named means comprising a trunnion member having a trunnion portion, a socket member having a socket portion for telescopic engagement with the trunnion portion, the axes of the trunnion and socket portions extending lengthwise in relation to the side members and transversely with respect to the cross members, and means for connecting the trunnion member and the socket member to the second cross member and to the second end of the casing, respectively, and providing for attachment and detachment of the trunnion member so that the latter, when detached, may be moved axially to effect telescopic engagement of the trunnion and socket portions incident to connecting said second end of the casing to the second cross member and to disengage such portions incident to disconnecting such end of the casing and the second cross member.

4. The combination as claimed in claim 3 wherein the second cross member has an opening extending therethrough to accommodate the trunnion member so that the latter may be moved lengthwise to engage and disengage the socket member and bolts are provided to attach the cross member and the trunnion member with the latter having its trunnion portion engaged in the socket portion.

5. The combination as claimed in claim 3 wherein the casing encompasses the driving axles and includes a body portion and a pair of bottom cover portions connected thereto by joints, the joints extending upwardly from the bottom of the casing and outwardly so as to intersect the axes of the driving axles to provide for removal of the latter from the bottom upon detachment of the cover portions and said lower connections being between the frame and the cover portion at the first end of the casing and being arranged to provide freedom for downward removal of such cover portion.

6. In a locomotive, a frame having side members connected by first and second cross members defining a rectangular space, means for supporting said frame including driving axles extending crosswise of said space, means including a turbine and reduction gearing for applying power to the driving axles, a casing enclosing the reduction gearing and supporting the latter and the turbine, said casing being disposed in said space with its first end located adjacent to said first cross member and its second end located adjacent to said second cross member, foot means connected to the first end of the casing and bearing horizontally on said first cross member, vertically-disposed pin means connecting the foot means to the first cross member, means cooperating with the frame and with the first end of the casing and acting in conjunction with said foot and pin means to oppose angular movement of said first end of the casing relative to the frame in a vertical transverse plane, a trunnion connected to the second cross member and extending in a direction which is lengthwise of the locomotive, and a socket for the trunnion and carried by the second end of the casing, said socket and trunnion being so located that the axis of the latter is at or near to the horizontal plane of the driving axle axes.

7. In a locomotive, a frame having side members connected by first and second cross members defining a rectangular space and the side members having portions extending below the cross members; means for supporting said frame including driving axles extending crosswise of said space; means including a turbine and reduction gearing for applying power to the driving axles; a casing enclosing the reduction gearing and supporting the latter and the turbine; said casing being disposed in said space with its first and second ends located adjacent to the first and second cross members, respectively, and with its lower portion extending below the cross members; foot means connected to the upper portion of the first end of the casing and bearing horizontally on said first cross member; vertically-disposed pin means connecting the foot means to the first cross member; means carried by portions of the side members extending below the first cross member and cooperating with the lower portion of the first end of the casing and acting in conjunction with said foot and pin means to oppose angular movement of said first end of the casing relative to the frame; a trunnion connected to the second cross member and extending in a direction which is lengthwise of the locomotive; and a socket for the trunnion and carried by the second end of the casing; said trunnion and socket being so located in relation to the casing and the second cross member that the trunnion axis is at or near to the horizontal plane of the driving axle axes.

8. In a locomotive, a frame having side members connected by first and second cross members defining a rectangular space, means for supporting said frame including driving axles extending crosswise of said space, means including a turbine and reduction gearing for applying power to the driving axles, a casing enclosing the reduction gearing and supporting the latter and the turbine, said casing being disposed in said space with its first end located adjacent to said first cross member and its second end located adjacent to said second cross member, a pair of upper spaced feet connected to the first end of the casing and bearing horizontally on top of said first cross member, a pair of lower spaced feet connected to the first end of the casing and bearing horizontally on said side members, vertically-disposed pin means connecting the feet to the cross and side members, a trunnion connected to the second cross members of the gear casing and extending in a direction which is lengthwise of the frame, a socket for the trunnion and carried by the second end of the casing, said socket and trunnion being so disposed in relation to the frame and to the casing that the trunnion axis is located at or near to the horizontal plane of the driving axle axes.

JOHN S. NEWTON.
EDWIN E. ARNOLD.